Patented Nov. 7, 1922.

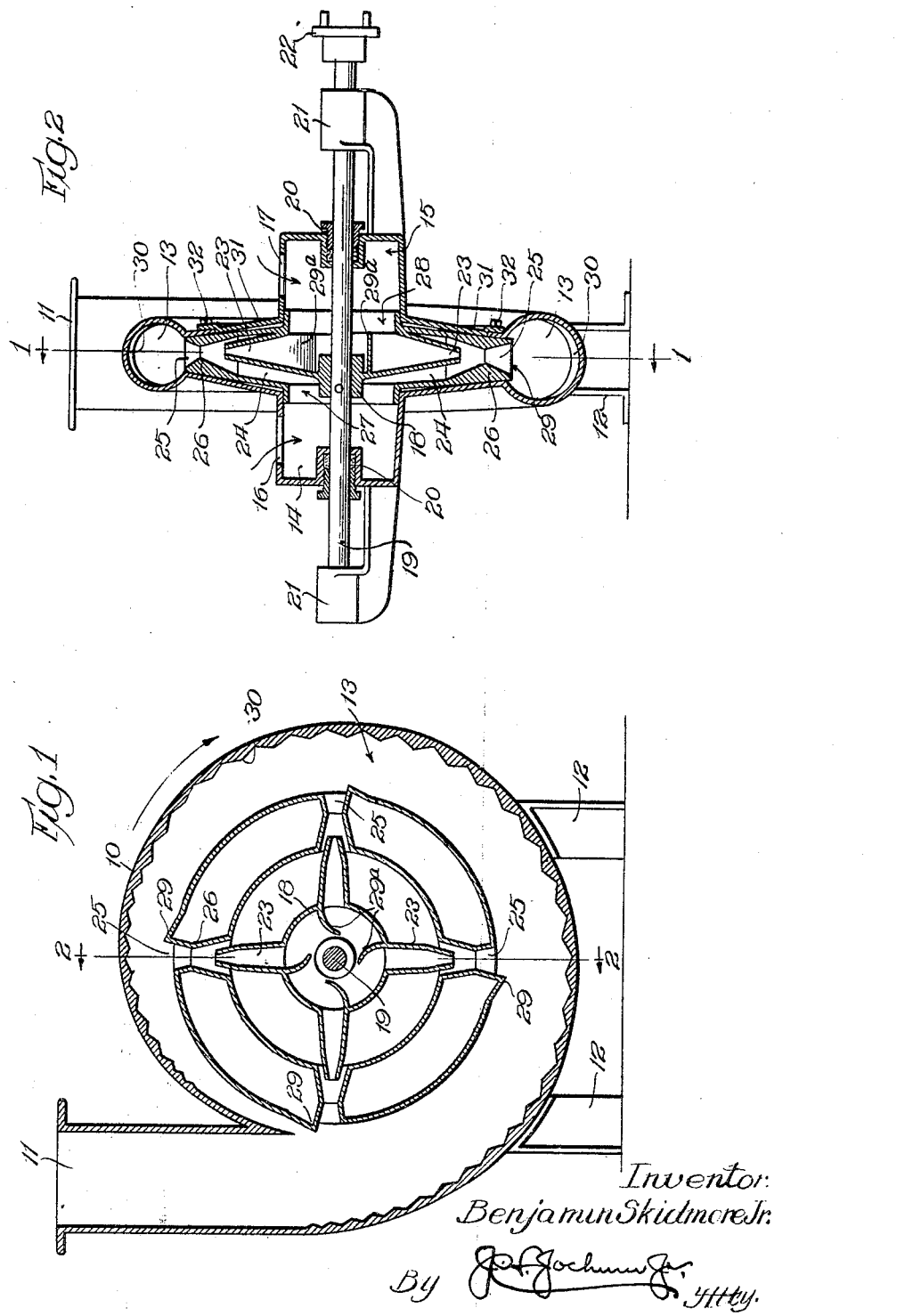

1,434,848

UNITED STATES PATENT OFFICE.

BENJAMIN SKIDMORE, JR., OF CHICAGO, ILLINOIS.

APPARATUS FOR MOVING AND MIXING FLUIDS.

Application filed October 13, 1919. Serial No. 330,336.

*To all whom it may concern:*

Be it known that I, BENJAMIN SKIDMORE, Jr., a citizen of the United States, residing at Chicago, in the county of Cook and State of Illinois, have invented certain new and useful Improvements in Apparatus for Moving and Mixing Fluids, of which the following is a specification.

This invention relates to improvements in apparatus for moving and mixing fluids, particularly adapted though not necessarily limited in its use for mixing a liquid and a gaseous fluid, and one of the objects of the invention is to provide an improved apparatus of this character which will insure a thorough breaking up and mixing of the particles of the liquid and fluid.

A further object is to provide an improved apparatus of this character which may be employed as a suction creating apparatus and which also may be employed as a means whereby a compression may be produced.

To the attainment of these ends and the accomplishment of other new and useful objects as will appear the invention consists in the features of novelty in substantially the construction, combination and arrangement of the several parts hereinafter more fully described and claimed and shown in the accompanying drawing illustrating this invention and in which;

Figure 1 is a vertical sectional view taken on line 1—1, Figure 2 of an apparatus of this character constructed in accordance with the principles of this invention.

Figure 2 is a vertical sectional view as taken on line 2—2, Figure 1.

Referring more particularly to the drawing the numeral 10 designates generally a casing of any desired size and configuration having a discharge outlet 11 and is supported in any desired or suitable manner such as by means of legs or supports 12. This casing 10 is provided with a volute shaped chamber 13 and the chamber is preferably enlarged laterally at its central portion as at 14—15, the portion 14 being provided with an inlet opening 16 and the portion 15 has an inlet opening 17.

Arranged within the chamber 13 is a rotor 18 which is connected with a shaft 19, the latter extending through stuffing boxes 20 in the walls of the portions 14—15 of the chamber and project through these stuffing boxes into suitable bearings 21 arranged exterior of the chamber. The shaft is given its motion from any suitable source and to which source it may be connected by a suitable coupling 22.

The rotor 18 is shaped to form a plurality of nozzles 23 and a chamber 24 which encompasses the nozzles. The nozzles 23 are preferably arranged at the center of the chamber 24 so that the outlet openings of the nozzles will be in alignment with openings 25 leading from the chamber 24 and through the periphery of the rotor. Each of the outlet openings 25 may be reduced as at 26 at a point intermediate the periphery of the rotor and the end of the nozzle 23 so as to assist in the entrainment of the fluid through the openings 25. The rotor is provided with an inlet opening 27 which has communication with the chamber 24 and also with the portion 14 of the chamber 13 so that the fluid or gas which enters the portion 14 of the chamber 13 through the opening 16 will be entrained into the chamber 24 of the rotor through the opening 27 and then out through the opening 25 into the volute chamber 13 to be discharged through the outlet 11.

The rotor is also provided with an inlet opening 28 which communicates with the nozzles 23 and also with the portion 15 of the chamber 13 so that a fluid entering through the opening 17 will flow through the opening 28, through the rotor to be picked up by the rotor and discharged by centrifugal force through the nozzles 23 across the chamber 24 and out of the opening 25 into the volute chamber 13. This action will cause the fluid to be sucked or entrained through the chamber 24 and discharged into the chamber 13.

If desired the rotor may be provided with a series of wings or blades 29ª one adjacent the inlet opening of each of the nozzles 23 so as to assist in picking up the fluid and delivering it to the nozzles 23.

It will thus be seen that when the rotor is set in operation and the liquid is admitted into the portion 15 of the chamber 13 it will be picked up by the rotor and discharged by centrifugal force through the nozzles 23 across the chamber 24 and out of the respective outlets 25 of the chamber. This action of the fluid across the chamber 24 will create a suction in the chamber which will be manifested through the opening 27 and in the portion 14 of the chamber 13. This suction will operate to draw in the gaseous fluid through the opening 16 and will entrain the same through the chamber 24 and into the chamber 13. This is due to the fact that the supply openings 16—17 and the inlet openings 27—28 of the rotor are out of communication with each other so that the liquid and fluid will not be brought into commingling relation until they meet at a point adjacent the outlet opening of the nozzles 23.

This entrainment of the fluid by the liquid will cause the two to commingle and mix as they are discharged into the chamber 13. As they flow through the volute shaped chamber 13 they will be subjected to a further mixing until they pass out of the discharge outlet 11.

If desired and in order to assist in the mixing of the liquid and fluid, the rotor 18 may be provided with wings or projections 29 on its periphery, one adjacent each of the discharge outlets 25 and the volute shaped chamber may also be provided with riffles or a corrugated surface 30 over which the liquid and fluid flow through the chamber and which riffles or corrugations will operate to break up and thoroughly mix the particles of fluid and liquid.

These projections 29 and the riffles or corrugations 30 are not necessary for the successful operation of this device and may therefore be omitted without seriously impairing the efficiency of the apparatus.

The casing 10 may be constructed in any suitable manner but in order to facilitate the assembling of the parts it is made in sections embodying a removable portion 31 which may be secured to the other portion of the casing in any suitable manner such as by means of fastening devices or bolts 32.

While this improved apparatus is particularly adapted for use in mixing a fluid and gas it is also well adapted for producing a suction or vacuum or for producing a compression. In the event that it is employed as a suction or pressure creating apparatus it is desirable to discharge the liquid and fluid from the casing 10 as rapidly as possible and in order to facilitate such rapid discharge it is obvious that the projections 29 on the periphery of the rotor and the riffles or corrugations 30 will be omitted.

While the preferred form of the invention has been herein shown and described it is to be understood that various changes may be made in the details of construction and in the combination and arrangement of the several parts without departing from the spirit of this invention.

What is claimed as new is:—

1. An apparatus of the character described embodying a volute shaped chamber having a plurality of inlets and a discharge outlet, a rotor in the chamber, said rotor having a fluid passage therethrough in communication with one of the said inlets and having a discharge outlet for delivering the fluid into the chamber, there being a liquid passage through the rotor having communication with the other inlet of the chamber, a discharge nozzle at the end of the liquid passage spaced from but disposed in alinement with the said discharge outlet of the rotor, the extremity of the nozzle being shaped to spray the liquid through the said discharge outlet of the rotor to entrain fluid through the fluid passage, the said fluid and liquid being further mixed in the volute chamber during their passage therethrough, and means adjacent the inlet end of the liquid passage for initially inducing a circulation of the liquid through the said liquid passage.

2. An apparatus of the character described embodying a volute shaped chamber having a plurality of inlets and a discharge outlet, a rotor in the chamber, said rotor having a fluid passage therethrough in communication with one of the said inlets and having a discharge outlet for delivering the fluid into the chamber, there being a liquid passage through the rotor having communication with the other inlet of the chamber, a discharge nozzle at the end of the liquid passage spaced from but disposed in alinement with the said discharge outlet of the rotor, the extremity of the nozzle being shaped to spray the liquid through the said discharge outlet of the rotor to entrain fluid through the fluid passage, the said fluid and liquid being further mixed in the volute chamber during their passage therethrough, and a blade carried by the rotor at the inlet end of the liquid passage for initially inducing a circulation of the liquid through the said liquid passage.

3. An apparatus of the character described embodying a volute shaped chamber having a plurality of inlets and a discharge outlet, a rotor in the chamber, said rotor having a fluid passage therethrough in communication with one of the said inlets and having a discharge outlet for delivering the fluid into the chamber, there being a liquid passage through the rotor having communication with the other inlet of the chamber, a discharge nozzle at the end of the liquid passage spaced from but disposed in alinement with the said discharge outlet of the rotor, whereby the liquid will be delivered by centrifugal force from the discharge nozzle through the said discharge outlet of the rotor to entrain fluid through the fluid passage, the said fluid and liquid being further mixed in the volute chamber during their passage therethrough, and means carried by the rotor to assist in further mixing the liquid and fluid in the volute chamber after they have been discharged from the rotor.

4. An apparatus of the character described embodying a volute shaped chamber having a plurality of inlets and a discharge outlet, a rotor in the chamber, said rotor having a fluid passage therethrough in communication with one of the said inlets and having a discharge outlet for delivering the fluid into the chamber, there being a liquid passage through the rotor, having communication with the other inlet of the chamber, a discharge nozzle at the end of the liquid passage spaced from but disposed in alinement with the said discharge outlet of the rotor, whereby the liquid will be delivered by centrifugal force from the discharge nozzle through the said discharge outlet of the rotor to entrain fluid through the fluid passage, the said fluid and liquid being further mixed in the volute chamber during their passage therethrough, and a projection carried by the rotor at the outlet end of the fluid discharge opening of the rotor to assist in further mixing the fluid and liquid in the volute chamber as the rotor is operated and the fluid and liquid have been delivered from the rotor.

5. An apparatus of the character described embodying a volute shaped chamber having a plurality of inlets and a discharge outlet, a rotor in the chamber, said rotor having a fluid passage therethrough is communication with one of the said inlets and having a discharge outlet for delivering the fluid into the chamber, there being a liquid passage through the rotor having communication with the other inlet of the chamber, and a discharge nozzle at the end of the liquid passage spaced from but disposed in alinement with the said discharge outlet of the rotor, the extremity of the nozzle being shaped to spray the liquid through the said discharge outlet of the rotor to entrain fluid through the fluid passage, the said fluid and liquid being further mixed in the volute chamber during their passage therethrough, the wall of the volute chamber being undulated.

In testimony whereof I have signed my name to this specification, on this 9th day of October, A. D. 1919.

BENJAMIN SKIDMORE, Jr.